Oct. 30, 1923.
A. GUFLER
ANIMAL TRAP
Filed Feb. 28, 1921
1,472,217
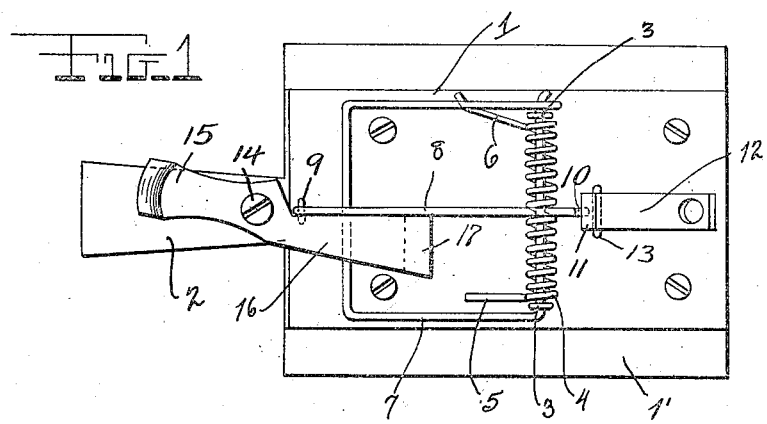
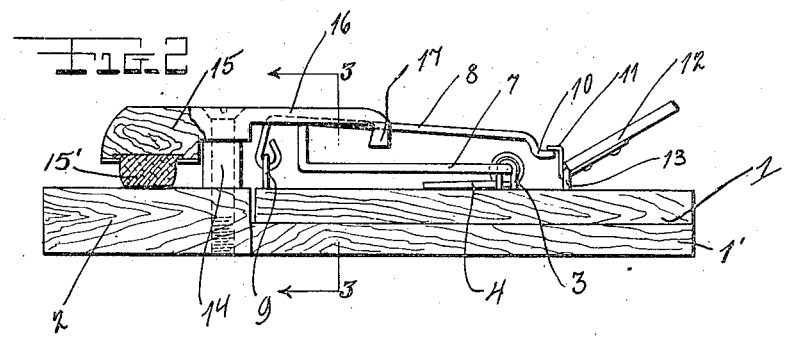
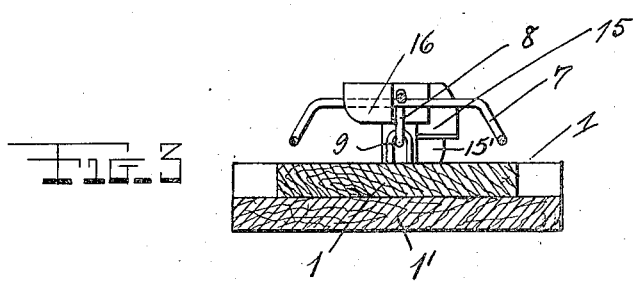
INVENTOR
Anton Gufler Patented Oct. 30, 1923.

1,472,217

UNITED STATES PATENT OFFICE.

ANTON GUFLER, OF NEW YORK, N. Y.

ANIMAL TRAP.

Application filed February 28, 1921. Serial No. 448,470.

*To all whom it may concern:*

Be it known that I, ANTON GUFLER, a citizen of Austria, residing at New York, in the county of New York and State of New York, have invented certain new and useful Improvements in Animal Traps, of which the following is a specification.

The main object of this invention is the provision of a solid, easily-set and quickly-actuated rodent trap.

The above and other objects will become apparent in the description below, in which like-named characters of reference refer to like-named parts in the drawings.

Referring briefly to the drawings, Fig. 1 is a plan view of the device.

Fig. 2 is a side elevational view of the same, partly in section.

Fig. 3 is a cross-sectional view on the line 3—3 of Fig. 1.

Referring in detail to the drawings, the numeral 1' represents the base of the device, having a handle extension 2 on which is secured by screws a pair of staples 3 fixed in the base, and a wire frame 7 is pivotally mounted in the staples. A coiled spring 4 engages the frame element between the staples, and has one extending end 6 acting against the frame side and the other end 5 resting against said base.

A locking rod 8 is pivotally supported in another staple 9 fixed in the base 1, said rod having a curved end 10 engageable with an angular tongue 11 attached to a bait-supporting member 12 which is pivotally attached to a support 13 fixed in the base 1.

A handled lever 15 is pivoted at 14 to the handle extension 2 of the sub-base 1', its forward end being provided with a down-turned lug 17 adapted to engage the raised portion of frame 7 when in one position and release it when in another position. A friction block 15' as of rubber, acts to prevent accidental displacement of the lever, the block impinging on the surface of the handle 2.

In setting the trap after it has been sprung, the frame 7 is brought into the position shown in the drawings, and the member 15 is turned into the position shown in Figure 1. The rod 8 is positioned to have the end 10 engage the tongue 11 and the member 15 is rotated out of engagement with the spring frame, after the bait has been placed on the member 12. Upon actuation of the member 12, the tongue 11 will release the rod 8, and the frame 7 will be forced instantly in a clockwise direction, by the action of the spring 4 striking and securing the rodent.

I claim:

An animal trap comprising a base, a handle integral with the base, a square-shaped striker composed of a single piece of wire rotatably mounted on said base, a coiled spring surrounding a part of said striker and normally urging said striker to swing outward away from said base, a bait-carrying plate pivotally attached to said base near one end of said plate and having a tongue extending upward from said end, a bar pivoted on said handle and adapted to lie in substantially horizontal position with its free end engaging said tongue to lock said striker against said base, a lever pivoted to said base and adapted to rotate horizontally, an offset hook on one end of said lever adapted to swing over said frame to lock said frame against said base while said rod is being positioned, and a friction element on the underside of the other end of said lever for holding said lever in frictional contact with said base against accidental release of said lever.

In witness whereof I affix my signature.

ANTON GUFLER.